US012384182B2

(12) United States Patent
Ozaki et al.

(10) Patent No.: US 12,384,182 B2
(45) Date of Patent: Aug. 12, 2025

(54) PRINTING DEVICE

(71) Applicant: SEIKO EPSON CORPORATION, Tokyo (JP)

(72) Inventors: Tsutomu Ozaki, Matsumoto (JP); Ryuji Moriyama, Matsumoto (JP); Akimasa Nozawa, Tatsuno-machi (JP); Yuta Watanabe, Matsumoto (JP)

(73) Assignee: Seiko Epson Corporation, Tokyo (JP)

( * ) Notice: Subject to any disclaimer, the term of this patent is extended or adjusted under 35 U.S.C. 154(b) by 71 days.

(21) Appl. No.: 18/454,410

(22) Filed: Aug. 23, 2023

(65) Prior Publication Data

US 2024/0066901 A1 Feb. 29, 2024

(30) Foreign Application Priority Data

Aug. 24, 2022 (JP) ................................ 2022-133480

(51) Int. Cl.

*B41J 2/165* (2006.01)
*B41J 29/13* (2006.01)
*B41J 29/17* (2006.01)

(52) U.S. Cl.

CPC ............... *B41J 29/17* (2013.01); *B41J 29/13* (2013.01)

(58) Field of Classification Search

CPC .... B41J 2/165; B41J 2/16517; B41J 2/16502; B41J 2/16505; B41J 2/16508; B41J 2/16588; B41J 2002/16576; B41J 2002/16558; B41J 29/17; B41J 29/13

See application file for complete search history.

(56) References Cited

U.S. PATENT DOCUMENTS

2003/0063177 A1* 4/2003 Yoshimura ............ B41J 2/1652 347/108
2017/0015101 A1* 1/2017 Coma Vives ........ B41J 2/16538
2021/0329139 A1 10/2021 Hiramatsu et al.
2022/0097381 A1* 3/2022 Shimomura ......... B41J 2/16538

FOREIGN PATENT DOCUMENTS

JP 2021-170731 A 10/2021

* cited by examiner

*Primary Examiner* — Scott A Richmond

(74) *Attorney, Agent, or Firm* — WORKMAN NYDEGGER

(57) ABSTRACT

A printing device includes a printing section that is provided on a first direction side with respect to a medium and that performs printing and a wiper that is detachably attached inside a housing and that is configured to wipe the printing section, wherein the wiper is configured to be pulled out from the housing by being pulled out in a second direction intersecting the first direction.

7 Claims, 6 Drawing Sheets

PRINTING DEVICE

The present application is based on, and claims priority from JP Application Serial Number 2022-133480, filed Aug. 24, 2022, the disclosure of which is hereby incorporated by reference herein in its entirety.

BACKGROUND

1. Technical Field

The present disclosure relates to a printing device.

2. Related Art

JP-A-2021-170731 discloses a recording device including a recording section that is provided inside a housing and that has a head ejecting ink onto a sheet and a movable carriage on which is mounted the head, and recording is performed on the sheet by the recording section. The recording device performs recording on a sheet placed lower by a recording section positioned higher.

In this type of recording device, a wiper may be provided for wiping off ink mainly adhering to the head in the recording section. Since ink from the recording section adheres to the wiper every time the wiper is wiped, the user needs to periodically remove the wiper from the recording device and perform maintenance. Since it is necessary to install the wiper at a position facing the head, the wiper is disposed at a position lower than the recording section in a case of a configuration in which recording is performed on a lower sheet from the higher recording section as in JP-A-2021-170731. Therefore, in a case of the configuration in which the wiper is removed from the direction in which the recording section is located, it is necessary to put a hand deeper into the housing by the dimension of the recording section, and it is easy to touch the portion of the wiper for wiping the ink of the recording section, and there is room for improvement in workability.

SUMMARY

According to an aspect to solve the above-described problem, a printing device includes a printing section that is provided on a first direction side with respect to a medium and that performs printing and a wiper that is detachably attached inside a housing and that is configured to wipe the printing section, wherein the wiper is configured to be pulled out from the housing by being pulled out in a second direction intersecting the first direction.

DESCRIPTION OF EMBODIMENTS

1. Overall Configuration

Figure 1:
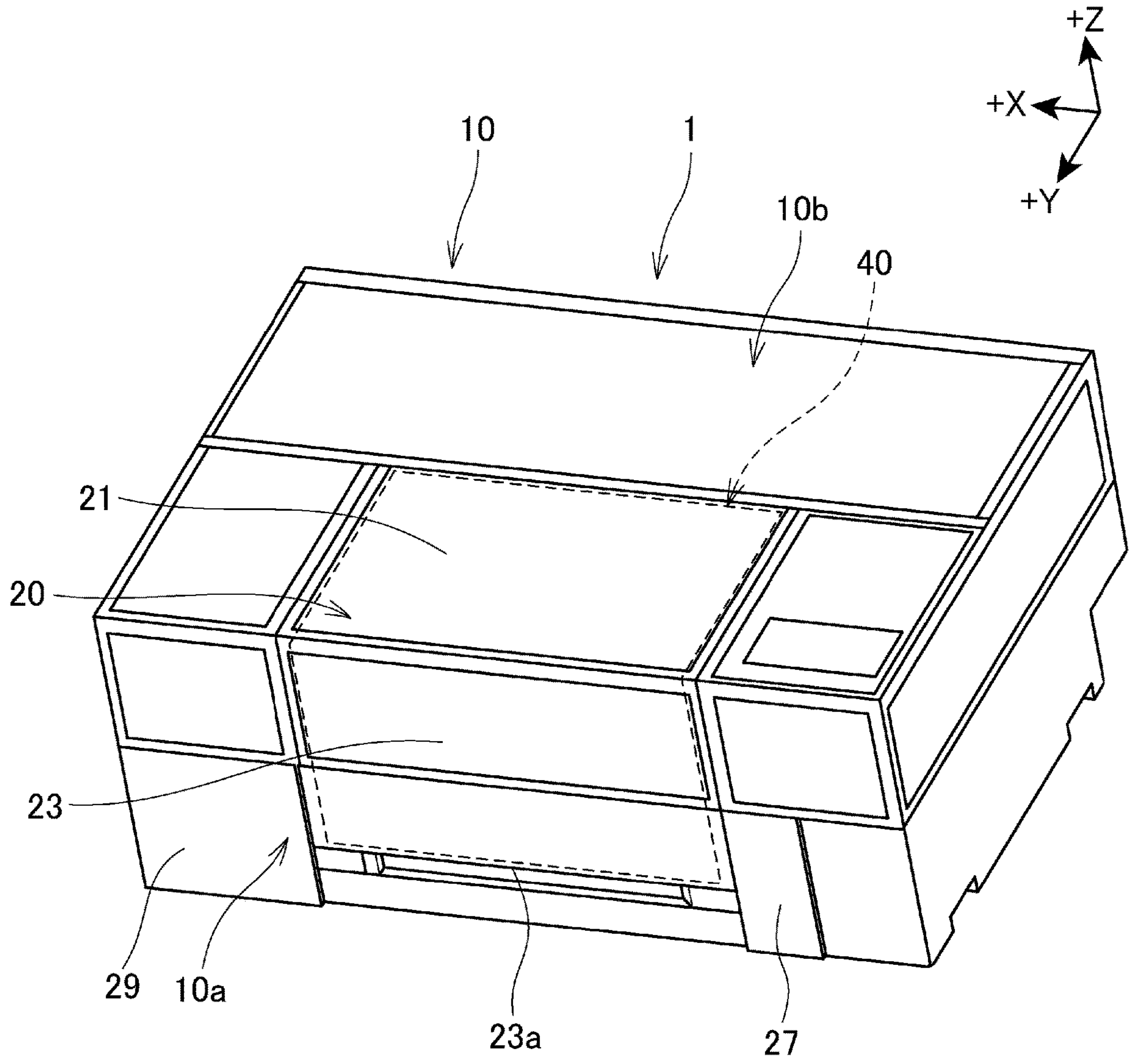
FIG. 1 is a perspective view of a printing device according to a present embodiment.

FIG. 1 is a perspective view of a printing device 1 according to a present embodiment. The printing device 1 is an apparatus that performs printing on the medium M supported by a medium support section 30 by ejecting liquid from a print head 89*a*. The medium M is a sheet, a fabric, or a three dimensional object. The sheet may be made of paper or synthetic resin. The fabric may be any of nonwoven, knit, and woven. The three dimensional object includes ornaments such as clothes and shoes, daily necessities, machine parts, and other various objects. The types of liquids to be ejected onto the medium M by the printing device 1 are not limited as long as the liquids have fluidity. For example, the printing device 1 is a printer that forms an image on the medium M by ejecting ink of one or a plurality of colors toward the surface of the medium M using the print head 89*a*. In this case, the medium M corresponds to a print medium.

FIG. 1 shows an X axis, a Y axis, and a Z axis. The X axis, the Y axis and the Z axis are orthogonal to each other. The Z axis is an axis extending in the up-down direction, and can also be referred to as an axis extending in the vertical direction. The X axis and the Y axis are parallel to a horizontal plane. In the following description, a direction along an X axis is referred to as a right-left direction, and a direction along a Y axis is referred to as a front-rear direction. Specifically, a positive direction along the Z axis is an upward direction, a positive direction along the X axis is a rightward direction, and a positive direction along the Y axis is a forward direction. The upward direction corresponds to an example of a “first direction”. The forward direction corresponds to an example of a “second direction”. The downward direction corresponds to an example of a “third direction”. The rearward direction corresponds to an example of a “fourth direction”.

The printing device 1 includes a housing 10. The housing 10 is a substantially rectangular parallelepiped box having a plurality of surfaces including a front surface 10*a* and a top surface 10*b*, and houses the medium support section 30, the print head 89*a*, and the like, which will be described later. The front surface 10*a* and the top surface 10*b* cross each other at a substantially right angle. An opening 40 is formed on the housing 10. The opening 40 is an opening formed across the top surface 10*b* and the front surface 10*a* of the housing 10, and brings the outside and the inside of the housing 10 into communication with each other.

The housing 10 includes a printer cover 20. The printer cover 20 is disposed along the top surface 10*b* and the front surface 10*a*. In detail, the printer cover 20 includes a first cover 21 that is disposed along the top surface 10*b* of the housing 10 and that covers the opening 40 of the top surface 10*b*, and a second cover 23 that is disposed along the front surface 10*a* of the housing 10 and that covers the opening 40 of the front surface 10*a*. A handle 23*a* for opening and closing the second cover is formed on the second cover 23. A user who uses the printing device 1 can access the respective sections housed in the housing 10 from the front and upper direction by opening the printer cover 20 by gripping the handle 23*a* from the front of the printing device 1.

Figure 2:
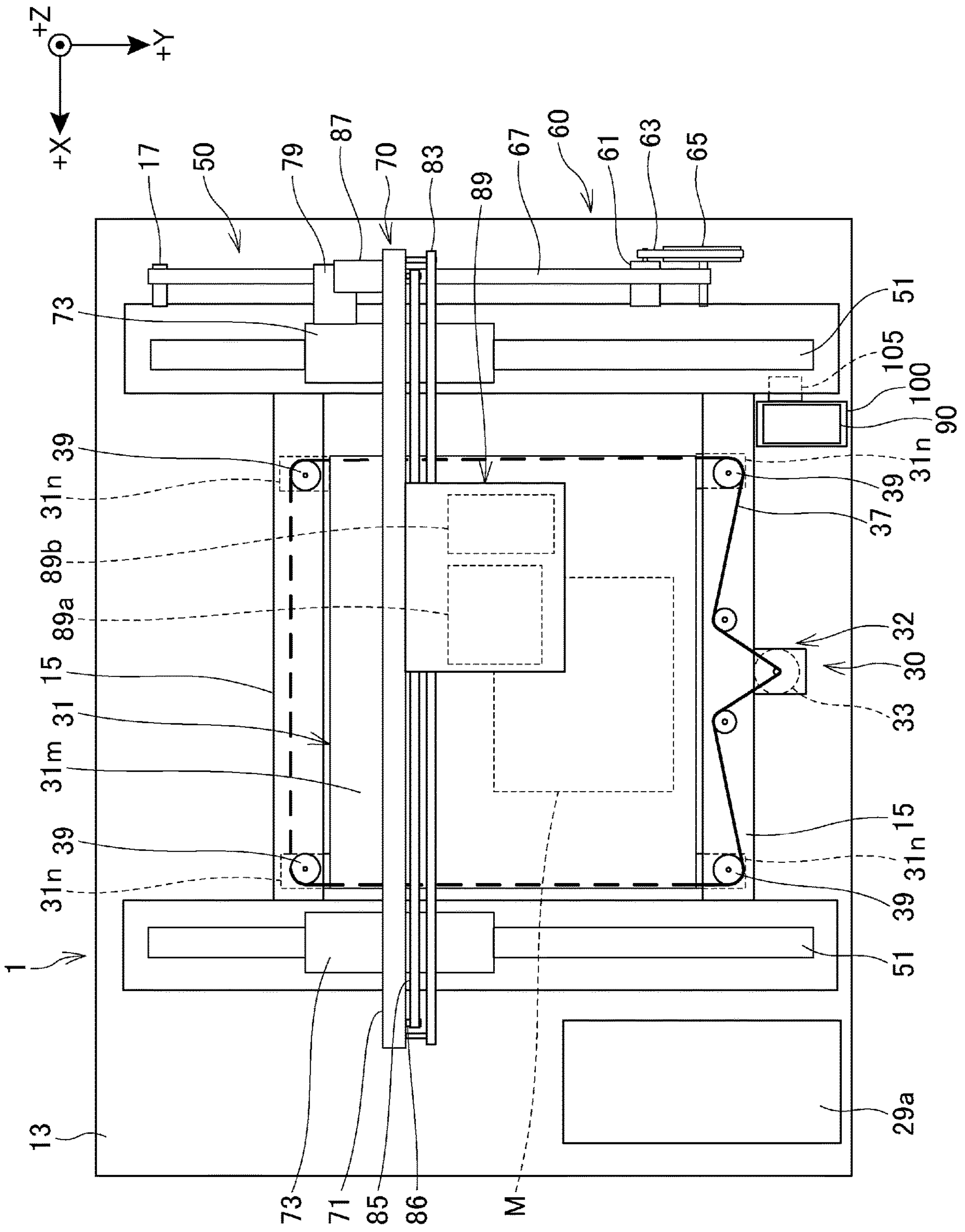
FIG. 2 is a plan view of a printing device.
Figure 3:
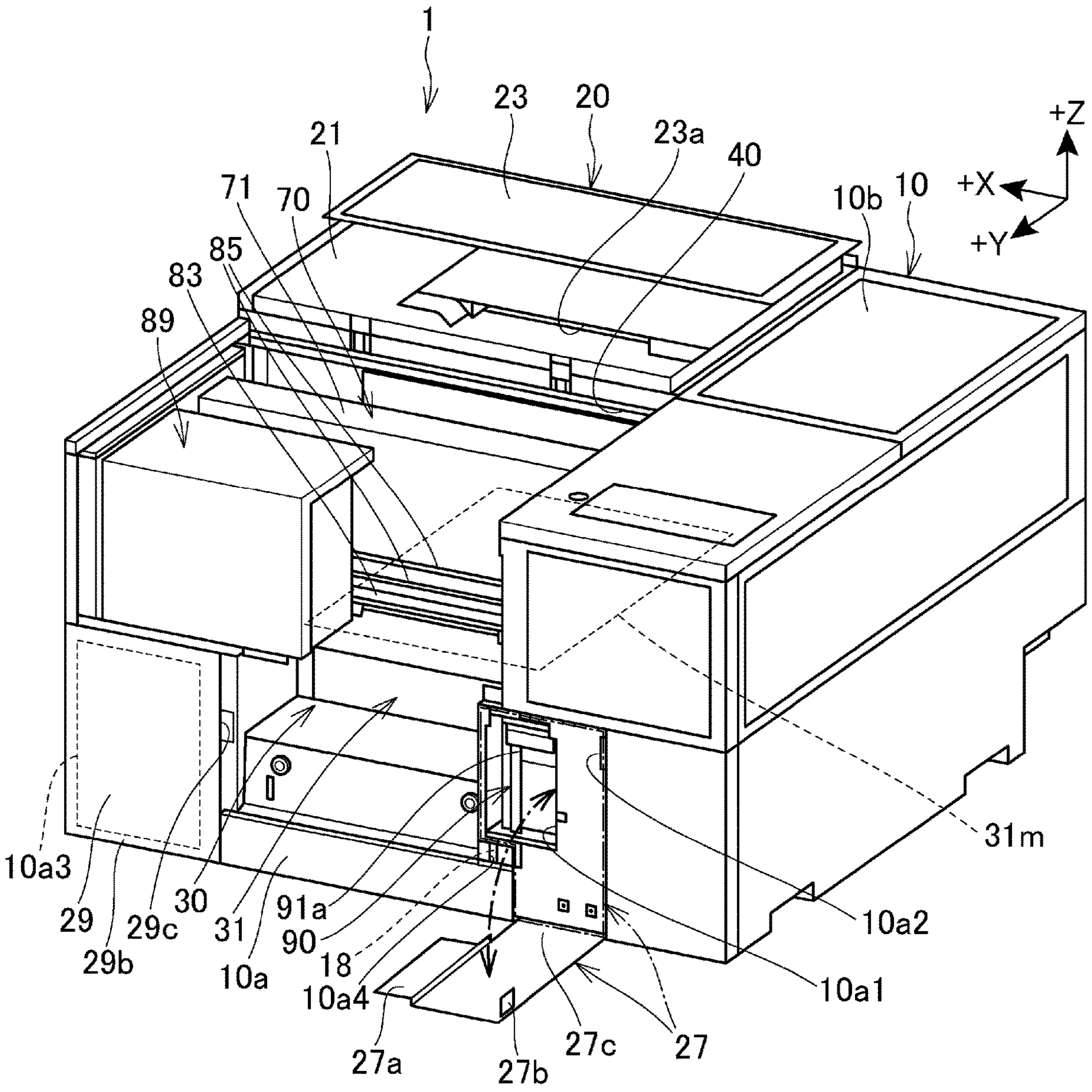
FIG. 3 is a perspective view of a printing device.

FIG. 2 is a plan view of the printing device 1, and schematically shows the internal structure of the printing device 1. FIG. 3 shows a perspective view of the printing device 1, in a state where the printer cover 20 is open.

As shown in FIG. 2, the printing device 1 includes a pair of base members 15, a pair of guide shafts 51, a medium supporting section 30, a drive mechanism 50, and a moving section 70. The base member 15 is a member extending in the left-right direction. Two base members 15 are arranged side by side in the front-rear direction on the bottom plate 13 and fixed to the bottom plate 13. The guide shafts 51 are shafts extending in the front-rear direction, and the two guide shafts 51 are arranged side by side in the left-right direction so as to straddle the two base members 15.

The medium support section 30 supports the medium M which is a printing target in the printing device 1. As shown in FIG. 2, the medium support section 30 includes a table 31 and a height movement mechanism 32. The table 31 is disposed at a position surrounded by the pair of base members 15 and the pair of guide shafts 51 in plan view. The table 31 has a support surface 31*m* which is a rectangular surface extending along the X axis and the Y axis and facing upward.

The support surface 31*m* supports the medium M placed on the support surface 31*m*. As shown in FIG. 3, when the opening 40 is not closed by the printer cover 20, the support surface 31*m* is exposed to the front and upper sides of the housing 10. That is, the opening 40 exposes the medium supporting section 30 to outside the housing 10. Therefore, in a state in which the printer cover 20 is open, the user can set the medium M outside the housing 10 on the support surface 31*m* of the medium support section 30 from the front. Further, in the state in which the printer cover 20 is open, the user can take out the medium M placed on the support surface 31*m* of the medium support section 30 to outside the housing 10 from the front.

Further, the table 31 is provided at the lower portions of the four corners of the support surface 31*m* with protrusions 31*n* that protrude outward from the support surface 31*m* in plan view. The table 31 is supported so as to be movable up and down with respect to the base member 15 by fixing the protrusion 31*n* to an elevator mechanism 39 (to be described later).

The height movement mechanism 32 is a mechanism that can raise and lower the support surface 31*m* and the medium M supported by the support surface 31*m* by raising and lowering the table 31 in the vertical direction. The height movement mechanism 32 includes an elevator motor 33, an elevator belt 37, and the elevator mechanism 39. The elevator mechanism 39 includes a ball screw arranged along the vertical direction, a nut screwed onto the ball screw, and a pulley. The ball screw of the elevator mechanism 39 is rotatably supported by the base member 15. The nut of the elevator mechanism 39 is fixed to the protrusion 31*n* of the table 31. The pulley of the elevator mechanism 39 is fixed to the upper portion of the ball screw. When the pulley of the elevator mechanism 39 rotates, the ball screw rotates, and the protrusion 31*n* moves along the vertical direction together with the nut with the rotation of the ball screw.

The elevator motor 33 is a motor that rotates under the control of a control section (not shown). The control section controls the rotation direction and the rotation amount of the elevator motor 33. The elevator belt 37 is an annular belt stretched around the output shaft of the elevator motor 33 and the pulleys of the four elevator mechanisms 39. By the rotation of the elevator motor 33, the elevator belt 37 is driven to circulate. The elevator belt 37 transmits rotation of the elevator motor 33 to the pulleys of the four elevator mechanisms 39. As a result, the ball screw of the elevator mechanism 39 rotates to move the table 31 in the vertical direction.

The rotation direction of the elevator motor 33 can be switched between a forward direction for moving the table 31 upward and a reverse direction for moving the table 31 downward. The printing device 1 moves the table 31 up and down by operating the elevator motor 33.

The drive mechanism 50 has the pair of guide shafts 51 and a frame driving section 60. The guide shaft 51 is a shaft-shaped member that spans across the pair of base members 15, and that is arranged along the front-rear direction.

The frame driving section 60 includes a frame moving motor 61, a transmission belt 63, a transmission mechanism 65, and a transmission belt 67. The frame moving motor 61 is a motor that rotates under the control of a control section (not shown). The transmission belt 63 is an annular belt stretched between the output shaft of the frame moving motor 61 and the transmission mechanism 65, and it transmits the driving force of the frame moving motor 61 to the transmission mechanism 65. The transmission mechanism 65 includes a first pulley and a second pulley. The transmission belt 63 is wound around the first pulley, and the transmission belt 67 is wound around the second pulley. The transmission mechanism 65 drives the transmission belt 67 by rotating the second pulley by the driving force transmitted from the transmission belt 63 to the first pulley. The transmission mechanism 65 transmits the driving force of the frame moving motor 61 to the transmission belt 67 at a speed reduction ratio corresponding to the ratio of the diameters of the first pulley and the second pulley.

The transmission belt 67 is an annular belt wrapped around the transmission mechanism 65 and a frame moving pulley 17 disposed at the rear end of the base member 15. The frame moving pulley 17 is a pulley rotatably installed on the base member 15. The transmission belt 67 is disposed along the guide shaft 51.

The moving section 70 includes a mainframe 71, a pair of leg sections 73, and a carriage 89. The mainframe 71 is a plate-shaped member that is elongated in the left-right direction. The pair of leg sections 73 are fitted to the pair of guide shafts 51 and are movable along the guide shafts 51. The mainframe 71 is fixed on the pair of leg sections 73 and is supported from below by the pair of leg sections 73. The mainframe 71 moves in the front-rear direction together with the pair of leg sections 73 while being guided by the pair of guide shafts 51.

Of the pair of leg sections 73, the transmission belt 67 is fixed via a belt coupler 79 to the leg section 73 supporting the left end of the mainframe 71. Therefore, when the transmission belt 67 is driven to circulate, a power for moving the leg section 73 in the front-rear direction acts on the leg section 73. Thus, the moving section 70 moves in the front-rear direction. The lower end of the mainframe 71 is located above the support surface 31*m* when the table 31 is located at the uppermost position. Therefore, the mainframe 71 moves in the front-rear direction above the support surface 31*m* without interfering with the support surface 31*m*.

The rotational direction of the frame moving motor 61 can be switched between a forward direction in which the mainframe 71 is moved forward and an opposite direction in which the mainframe 71 is moved rearward. The printing device 1 moves the mainframe 71 forward and rearward by operating the frame moving motor 61.

The carriage 89 is a box of a substantially rectangular parallelepiped shape, and is supported by the mainframe 71 via a carriage guide shaft 83. The carriage guide shaft 83 is a shaft-shaped member fixed to the mainframe 71, and extends in the left-right direction along the mainframe 71. The carriage guide shaft 83 supports the carriage 89 so as to be movable in the left-right direction. The lower end of the carriage 89 is located above the support surface 31*m* when the table 31 is located at the uppermost position. Therefore, the carriage 89 moves in the front-rear direction and the left-right direction above the support surface 31*m* without interfering with the support surface 31*m*.

The carriage 89 is coupled to a carriage drive belt 85. The carriage drive belt 85 is an annular belt disposed along the carriage guide shaft 83 and is wrapped around a carriage drive pulley 86 at one end and the output shaft of a carriage drive motor 87 at the other end. The carriage drive pulley 86 is a pulley rotatably fixed to the right end of the mainframe 71. The carriage drive motor 87 is a motor that is fixed to the left end of the mainframe 71 and that rotates an output shaft thereof under the control of a control section (not shown). The carriage drive motor 87 drives the carriage drive belt 85 to circulate by rotating the output shaft. By this, the carriage drive motor 87 moves the carriage 89 coupled to the carriage drive belt 85 in the left-right direction along the carriage guide shaft 83.

The carriage 89 includes the print head 89*a* and an irradiation section 89*b*. The print head 89*a* has a plurality of nozzles (not shown) that are provided on the upper side of the medium M and that open downward from the lower end surface of the carriage 89. The print head 89*a* ejects liquid from these nozzles by driving a Piezo actuator (not shown) according to the control of the control section. When the print head 89*a* ejects liquid from the nozzles, the ejected liquid flies between the nozzles and the medium M supported on the table 31 and lands on the medium M. In the present embodiment, the liquid ejected from the nozzles of the print head 89*a* is ink that is cured by ultraviolet rays. The print head 89*a* prints characters and images formed by liquid on the medium M from above by causing the liquid to land on the medium M supported by the medium support section 30. The print head 89*a* corresponds to an example of a "printing section".

The irradiation section 89*b* includes an irradiation window (not shown) facing downward from the lower end surface of the carriage 89. The irradiation window is formed of a plate made of a translucent material. The irradiation section 89*b* emits irradiation light from a light source unit (not shown) via an irradiation window. The irradiation light emitted from the irradiation section 89*b* passes between the irradiation window and the medium M placed on the table 31, and irradiates the medium M printed on by the print head 89*a*. In the present embodiment, the irradiation section 89*b* includes an UltraViolet Light Emitting Diode (UV-LED) that emits ultraviolet rays, and the irradiation light is ultraviolet rays. That is, in the present embodiment, the irradiation section 89*b* irradiates the ink, which is cured by ultraviolet rays, that landed on the medium M with ultraviolet rays to fix the ink to the medium M.

The ink ejected by the print head 89*a* is supplied from a cartridge-type ink replacement mechanism 29*a*. As shown in FIG. 3, the ink replacement mechanism 29*a* holds a cartridge inserted via an opening 10*a*3 in the front surface 10*a* of the housing 10, and supplies ink in the cartridge to the print head 89*a*. The opening 10*a*3 is covered by an ink replacement cover 29 from the front. A lower end 29*b* of the ink replacement cover 29 is coupled to the housing 10 by a hinge, and a handle 29*c* is pulled forward to open the ink replacement cover 29.

As shown in FIG. 3, a hole 10*a*4 is formed in the front surface 10*a* of the housing 10, and it brings the outside of the housing 10 into communication with an open-and-closed sensor 18 inside the housing 10. The hole 10*a*4 is located at a position covered from the front by the handle 23*a* of the second cover 23 when the printer cover 20 is closed. In a state where the printer cover 20 is closed, a protrusion (not shown) formed on the handle 23*a* is inserted into the hole 10*a*4, and the switch of the open-and-closed sensor 18 is pressed by the protrusion. The open-and-closed sensor 18 is a contact type sensor, detects whether the printer cover 20 is open or closed depending on whether or not the switch is pressed, and sends a signal corresponding to the detected open or closed state to the control section. When the open-and-closed sensor 18 detects that the printer cover 20 is in the open state, the control section stops the operation of all actuators provided in the printing device 1. Accordingly, it is possible to prevent the user from erroneously putting a hand or the like into the housing 10 during the operation of any of the actuators of the printing device 1.

The control section includes a processor such as a Central Processing Unit (CPU) or a Micro Processing Unit (MPU), and a storage unit. The storage unit of the control section has a volatile memory and a nonvolatile storage section. The volatile memory is, for example, a Random Access Memory (RAM). The nonvolatile storage section is composed of a Read Only Memory (ROM), a hard disk, a flash memory, or the like. The control section controls each section of the printing device 1 by executing a program stored in the storage section.

2. Configuration of Wiper Cover

As shown in FIGS. 2 and 3, in the printing device 1, a wiper 90 that wipes the print head 89*a* is disposed in front of the front end of the support surface 31*m*. The Y axis and X axis position occupied by the wiper 90 does not overlap the Y axis and the X axis position occupied by the support surface 31*m*. The wiper 90 is detachably attached to a wiper holder 100 provided inside the housing 10, and is inserted into and removed from the housing 10 in the front-rear direction via the opening 10*a*1 of the front surface 10*a*.

The opening 10*a*1 and the wiper 90 are covered from the front by a wiper cover 27 that can be opened and closed. The wiper cover 27 is a plate-shaped member that, by closing, closes the opening 10*a*1 from the front. In other words, the wiper cover 27 is brought into a closed state by moving rearward to cover the wiper 90. A lower end 27*c* of the wiper cover 27 is couple to the housing 10 via a hinge, and the wiper cover 27 opens forward by being rotated forward about the hinge around the X axis. As shown in FIG. 3, the wiper cover 27 can be rotated by about 90 degrees. The wiper cover 27, in the open state, is positioned below the opening 10*a*1 and the lower end of the wiper 90. The wiper cover 27 has a protrusion 27*b* fitted into a hole 10*a*2 of the front surface 10*a*. When the protrusion 27*b* is fitted into the hole 10*a*2, the wiper cover 27 is held in a closed state.

Figure 4:
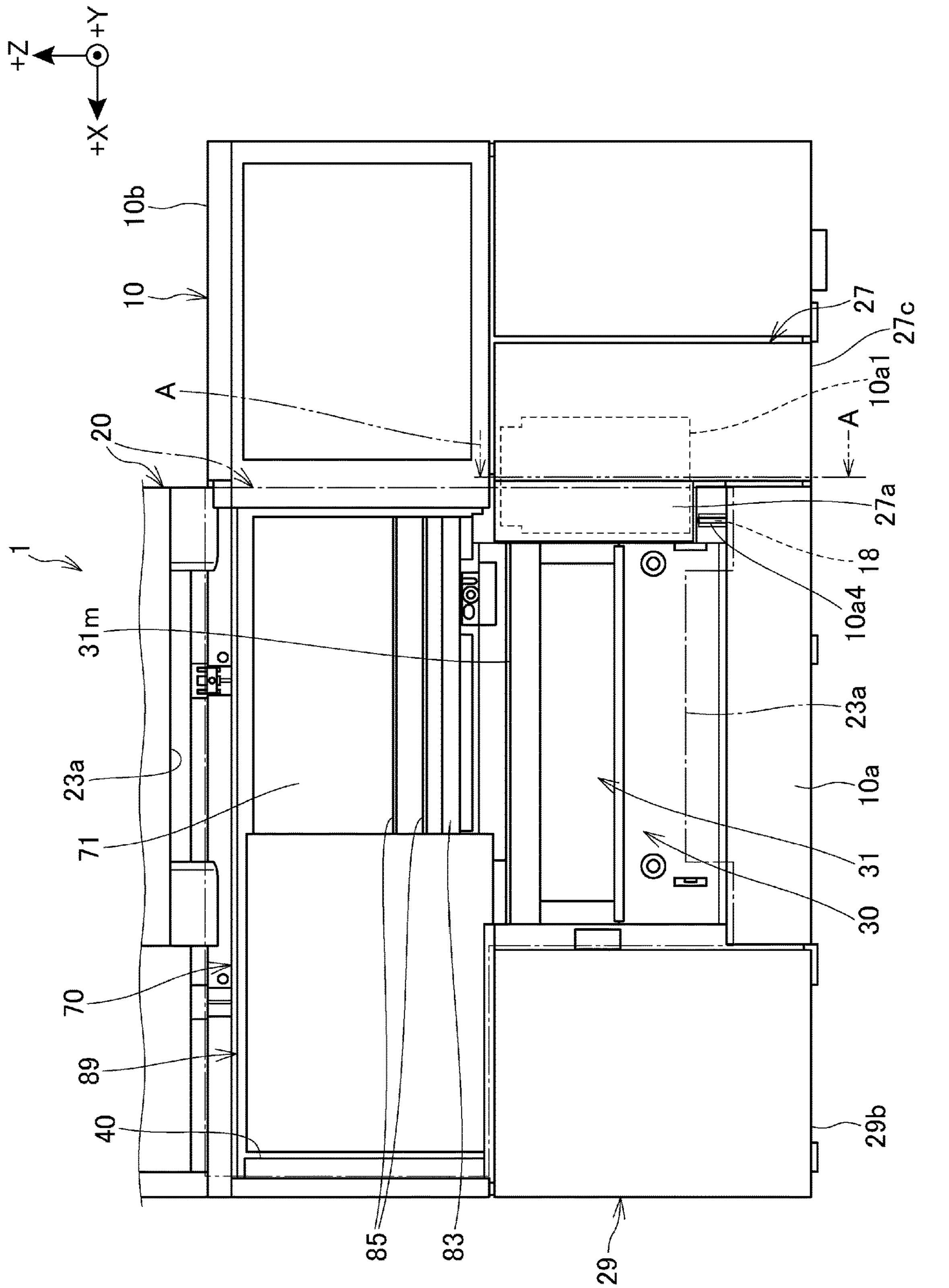
FIG. 4 is a side view of a printing device.
Figure 5:
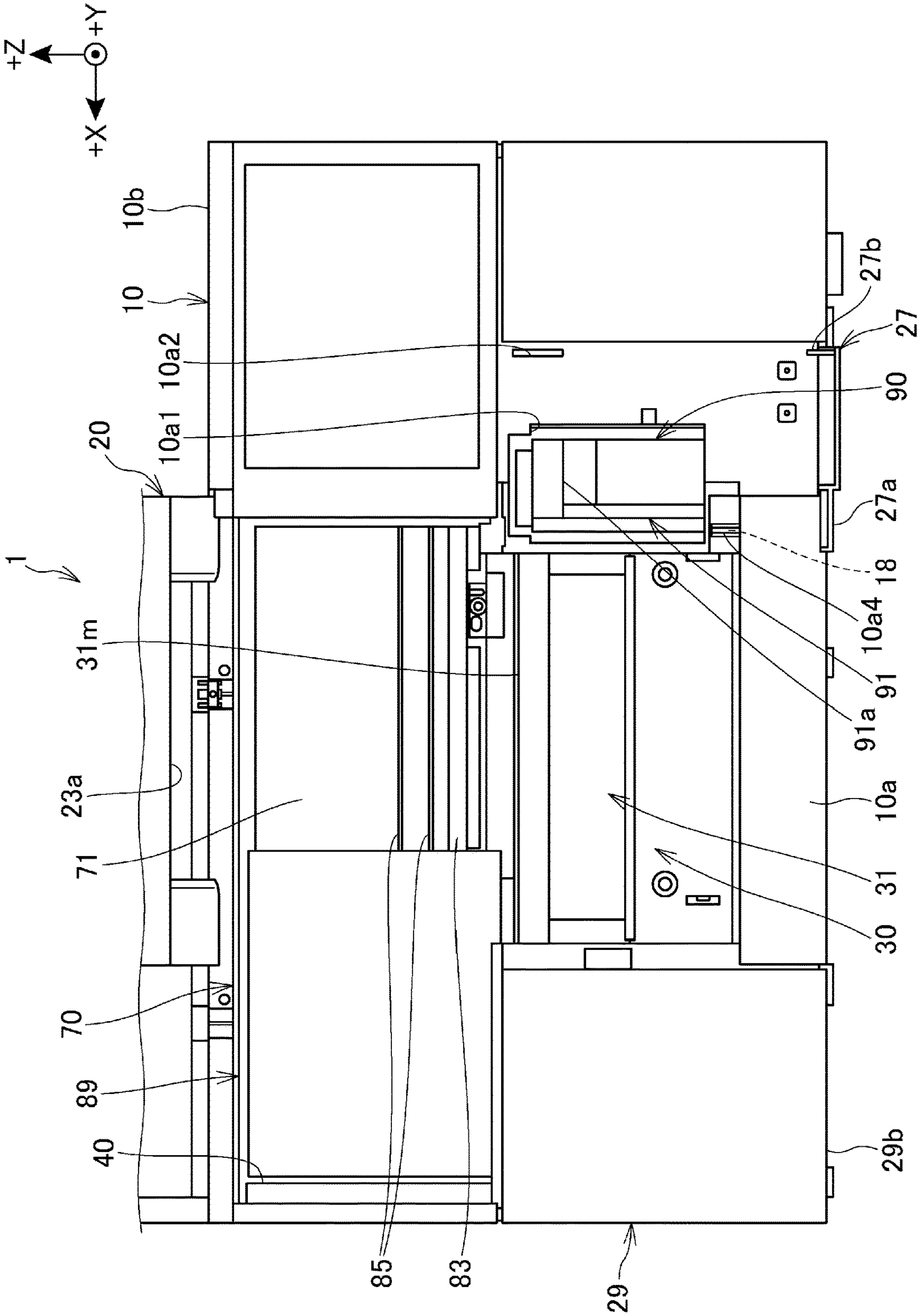
FIG. 5 is a side view of a printing device.

FIG. 4 is a side view of the printing device 1, and shows the printing device 1 with the wiper cover 27 closed as viewed from the front. FIG. 5 is a side view of the printing device 1, and shows the printing device 1, viewed from the front with the wiper cover 27 open.

As shown in FIG. 4, the wiper cover 27 in the closed state covers the entire opening 10*a*1 from the front.

The wiper cover 27 includes an extension section 27*a* that extends to the right side and covers the opening 10*a*1 from the front side. As indicated by an imaginary line in FIG. 4, the printer cover 20 in the closed state overlaps the extension section 27*a* from the front in a state where the wiper cover 27 is closed. In other words, the printer cover 20 enters a closed state by moving rearward to cover the extension section 27*a*. Therefore, in a state where the printer cover 20 is closed, when the wiper cover 27 rotates, the extension section 27*a* interferes with the printer cover 20. Therefore, when the printer cover 20 is closed, the opening and closing of the wiper cover 27 is regulated.

3. Configuration of Wiper

Figure 6:
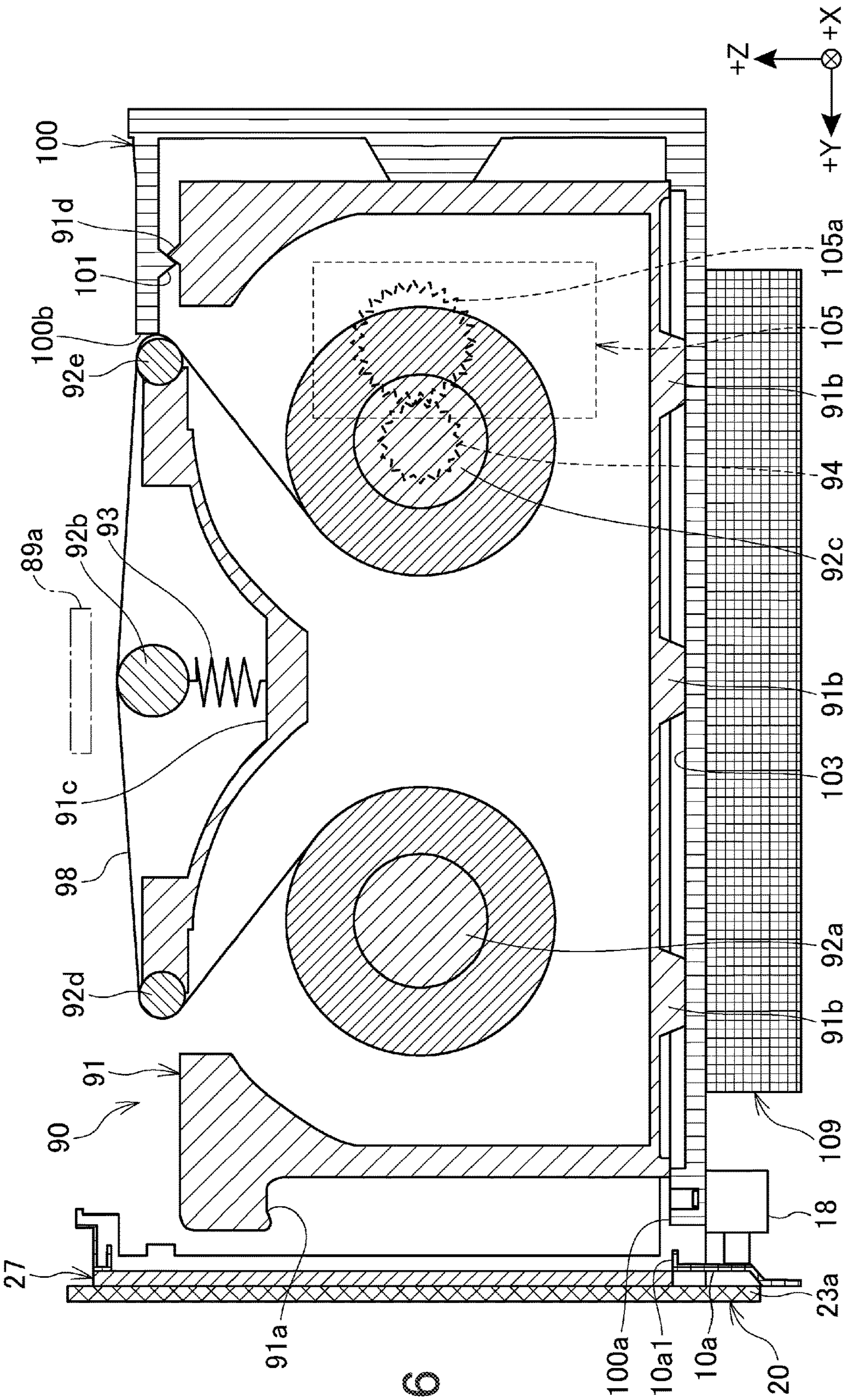
FIG. 6 is a sectional view taken along a line A-A of FIG. 4.

FIG. 6 is a cross-sectional view taken along a line A-A in FIG. 4, and shows configuration of the wiper 90.

As shown in FIG. 6, the wiper 90 includes a box-shaped case 91 and rollers 92*a* to 92*e* rotatably supported by the case 91. The case 91 has a substantially rectangular parallelepiped outer shape, and stores therein a belt-like fabric 98 for wiping the print head 89*a*. The fabric 98 stored in the case 91 is wound around the rollers 92*a* to 92*e*. The case 91 has a handle 91*a* protruding forward. The handle 91*a* is a section on which the user hooks his or her finger when the user moves the wiper 90 in and out from the opening 10*a*1 in the front-back direction.

The roller 92*a* is a roller on which an unused roll-shaped fabric 98 is mounted. The roller 92*b* is a roller around which is wound the fabric 98 pulled out from the roller 92*a*. The roller 92*b* is movable in the vertical direction with respect to the case 91 and is urged upward by a compression spring 93. The upper end of the roller 92*b* is located above a top surface 91*c* of the case 91, and is located above the other rollers 92*a* and 92*c* to 92*e*. The wiper 90 removes ink adhering to the print head 89*a* by wiping the print head 89*a* with a portion of the fabric 98 wound around the roller 92*b*. The roller 92*c* is a roller for winding up the used fabric 98. The roller 92*c* is fixed to the same shaft as a gear 94 provided on the left outer surface of the case 91, and the gear 94 and the roller 92*c* rotate in synchronization with each other. When the roller 92*c* rotates and winds up the used fabric 98, the unused fabric wound around the roller 92*a* is drawn out up to the roller 92*b* at the same time. The fabric 98 between the roller 92*a* and the roller 92*b* winds around the roller 92*d*. The fabric 98 between the roller 92*b* and the roller 92*c* winds around a roller 92*e*.

As shown in FIG. 6, the wiper 90 is detachably attached to the inside of the box-shaped wiper holder 100 in the housing 10. Openings 100*a* and 100*b* are formed in the front surface and the top surface of the wiper holder 100, respectively. While attached to the wiper holder 100, the wiper 90 is pulled out from the housing 10 by being pulled out in the front direction via the opening 100*a* and the opening 10*a*1 of the front surface 10*a* of the housing 10. While outside the housing 10, the wiper 90 is attached to the wiper holder 100 by being pushed rearward via the opening 10*a*1 and the opening 100*a*. In a state where the wiper 90 is attached to the wiper holder 100, the roller 92*b* protrudes upward from the top surface of the wiper holder 100 via the opening 100*b*.

The wiper holder 100 has a protrusion 101, a groove 103, and a wiper drive mechanism 105.

The protrusion 101 protrudes downward from the inner top surface of the wiper holder 100. The protrusion 101 is brought into contact from the front side with a protrusion 91*d* protruding upward from the top surface 91*c* of the case 91, thereby making it difficult for the wiper 90 to pull out forward from the wiper holder 100.

The groove 103 is formed on the inner bottom surface of the wiper holder 100 and extends in the front-rear direction. A protrusion 91*b* protruding downward from the outer bottom surface of the case 91 is inserted into the groove 103. The width of the groove 103 in the left-right direction is substantially equal to the width of the protrusion 91*b* in the left-right direction. When the wiper 90 is attached to or detached from the wiper holder 100, the protrusion 91*b* slides in the front-rear direction along the groove 103.

The wiper drive mechanism 105 includes a motor (not shown) controlled by a control section, a transmission mechanism (not shown), and an output gear 105*a* to which a driving force from the motor is transmitted via the transmission mechanism. The gear 105*a* is positioned on the left inner surface of the wiper holder 100, and engages with the gear 94 of the wiper 90 from the rear. The wiper drive mechanism 105 rotates the gear 105*a* by rotation of the motor, and rotates the roller 92*c* via the gear 94 engaged with the gear 105*a*. That is, the control section controls the operation of the wiper 90 by operating the motor of the wiper drive mechanism 105.

The wiper holder 100 is supported by an elevator 109 fixed to the housing 10. The elevator 109 has an air cylinder that operates according to the control of the control section, and moves the wiper holder 100, which is supported via the air cylinder, in the vertical direction. When the elevator 109 moves the wiper holder 100 to the uppermost position, the upper end of the roller 92*b* is located above the lower end of the print head 89*a*. While the upper end of the roller 92*b* is located above the lower end of the print head 89*a*, the print head 89*a* and the roller 92*b* will overlap each other in a plan view by movement of the carriage 89, so that the wiper 90 wipes the print head 89*a* with the fabric 98.

When the elevator 109 moves the wiper holder 100 to the lowermost position, the upper end of the roller 92*b* is positioned below the lower end of the print head 89*a*. In this state, even when the print head 89*a* and the roller 92*b* overlap each other in a plan view due to the movement of the carriage 89, the fabric 98 and the print head 89*a* do not come into contact with each other. In the present embodiment, the upper end of the roller 92*b* is located below the lower end of the print head 89*a* except when the wiper 90 wipes the print head 89*a* with the fabric 98.

4. Operation in Maintenance of Wiper

Next, an operation when the user performs maintenance of the wiper 90 inside the housing 10 will be described. The maintenance work of the wiper 90 is performed, for example, when the remaining amount of the unused roll-shaped fabric 98 mounted on the roller 92*a* runs out.

In the maintenance of the wiper 90, first, the user detaches the wiper 90 from the wiper holder 100 and takes the wiper 90 out of the housing 10.

To be specific, first, the user holds the handle 23*a* from the front of the housing 10 and pulls the printer cover 20 forward. As a result, the printer cover 20 opens forward. Thereafter, the user lifts upward the printer cover 20 that was opened forward. Thus, the extension section 27*a* of the wiper cover 27, which was covered from the front by a second cover 23 of the printer cover 20, is exposed. Therefore, when the wiper cover 27 is rotated, the extension section 27*a* and the printer cover 20 do not interfere with each other.

Next, the user pulls the wiper cover 27 forward, and pivots the wiper cover 27 around the lower end 27*c* of the wiper cover 27 with the left-right direction as the axis. By this, the wiper cover 27 opens forward by about 90 degrees so as to be oriented substantially horizontal, and the opening 10*a*1 of the front surface 10*a* is exposed forward. Further, the handle 91*a* of the wiper 90 is exposed forward to outside the housing 10 via the opening 10*al*.

Next, the user grips the handle 91*a* of the wiper 90 and pulls the wiper 90 forward. When the user pulls the wiper 90 forward with a force equal to or greater than a predetermined load, the protrusion 91*d* of the wiper 90 moves forward over the protrusion 101 of the wiper holder 100. Thus, the wiper 90 is removed from the wiper holder 100. When the user continues to pull the wiper 90 forward, the wiper 90 is taken out from the housing 10 via the opening 100*a* of the wiper holder 100 and the opening 10*a*1 of the housing 10.

In this way, the wiper 90 can be taken out from the housing 10 by being pulled out forward, not upward where the fabric 98 to which ink adheres passes. Therefore, when the user takes out the wiper 90 to the outside of the housing 10, the user's hand is less likely to be stained. In addition, since it is not necessary to secure a space for the print head 89*a* to move in front of the wiper 90, the wiper 90 is easily disposed in the vicinity of the front surface 10*a* of the housing 10. Therefore, when the user pulls out the wiper 90, there is no need to insert his/her hand deep inside the housing 10, so the wiper 90 can be easily pulled out. Further, the wiper cover 27 is opened by pivoting about the lower end 27*c* with the left-right direction as an axis, and the wiper cover 27 in the opened state is positioned below the opening 10*a*1 and the wiper 90. Therefore, when the user pulls the wiper 90 out from the housing 10, the fabric 98 to which the ink is attached is unlikely to come into contact with the wiper cover 27, and the wiper cover 27 is unlikely to be contaminated.

After the wiper 90 is taken out to the outside of the housing 10, the user performs maintenance of the wiper 90, including replacement of the fabric 98. The user mounts the wiper 90 into the wiper holder 100 again after finishing the maintenance of the wiper 90.

To be specific, the user inserts the wiper 90 for which maintenance has been completed into the wiper holder 100 via the opening 10*a*1 and the opening 100*a*. At this time, when the user inserts the wiper 90 rearward with a predetermined load or more, the protrusion 91*d* of the wiper 90 rides over the protrusion 101 of the wiper holder 100 rearward. By this, the wiper 90 is mounted into the wiper holder 100. Thereafter, the user sequentially closes the wiper cover 27 and the printer cover 20, thereby completing the maintenance work of the wiper 90.

5. Other Embodiments

The above embodiment is merely a specific example of the present disclosure. The present disclosure is not limited to the configuration of the above embodiment, but can be implemented in various forms to the extent that it does not depart from the scope of the disclosure.

In the above embodiment, the printing device 1 has been described as having the open-and-closed sensor 18 for detecting whether the printer cover 20 is open or closed, but this is an example. For example, the printing device 1 may further include a sensor that detects whether the wiper cover 27 is open or closed, and the control section may be configured to stop various actuators of the printing device 1 while the sensor detects the open state of the wiper cover 27. In this case, it is possible to further prevent the user from putting his/her hand or the like inside the housing 10 while any of the actuators of the printing device 1 is operating. In addition, the open-and-closed sensor 18 is not limited to a contact sensor, and may be a non-contact sensor such as an optical sensor or a magnetic sensor.

In the above embodiment, the wiper 90 is described as a device for wiping the print head 89*a* with the fabric 98, but this is an example. For example, the wiper 90 may be a device that wipes the print head 89*a* with rolled paper. In addition, for example, the printing device 1 may have a configuration in which the print head 89*a* is scanned in a state of being in contact with a blade made of rubber, and the ink attached to the print head 89*a* is scraped off by the blade.

In the above-described embodiment, the direction in which the wiper 90 is pulled out via the opening 10*a*1 was described as the front direction, which is the second direction orthogonal to the upward direction, which is the first direction. This configuration is an example, and the direction in which the wiper 90 is pulled out may be any direction that intersects the first direction. For example, the wiper 90 may be configured to be pulled out in a direction inclined with respect to the front side and to be taken out to the outside of the housing 10. In addition, the direction in which the printer cover 20 and the wiper cover 27 are opened may be any direction in which the wiper 90 can be pulled out, and for example, may be a direction different from the front direction.

6. Configurations Described by Embodiment

According to the above embodiment, the following configurations are described.

(Configuration 1) A printing device includes a printing section that is provided on a first direction side with respect to a medium and that performs printing and a wiper that is detachably attached inside a housing and that is configured to wipe the printing section, wherein the wiper is configured to be pulled out from the housing by being pulled out in a second direction intersecting the first direction.

According to this configuration, when the wiper is taken out to the outside of the housing, it is not necessary to insert a hand to the inside of the housing from the first direction side where the printing section is provided, and the wiper can be taken out from the second direction side. Therefore, it is easy to take out the wiper from the inside of the housing.

(Configuration 2) The printing device, according to the configuration 1, further includes an openable and closable wiper cover, wherein the wiper cover enters a closed state by moving in a fourth direction opposite to the second direction to cover the wiper.

According to this configuration, the wiper can be covered by the wiper cover moving in the direction opposite to the direction in which the wiper is pulled out.

(Configuration 3) The printing device, according to the configuration 2, further includes a medium support section configured to support the medium and a printer cover configured to open a part of the housing to expose the medium support section, wherein the printer cover enters a closed state by moving in the fourth direction to cover at least a part of the wiper cover and the wiper cover opens in the second direction.

According to this configuration, opening and closing of the wiper cover can be regulated by the printer cover. Therefore, it is possible to prevent the wiper cover from opening due to factors other than the operation of the user.

(Configuration 4) The printing device, according to the configuration 3, wherein the printer cover opens in the second direction. According to this configuration, since both the printer cover and the wiper cover open in the second direction, it is possible to easily be open and closed the wiper cover from the second direction side.

(Configuration 5) The printing device, according to the configurations 3 or 4, further includes a control section controlling the printing section and the wiper and an open-and-closed sensor configured to detect whether the printer cover is open or closed, wherein the control section stops operation of the printing section and the wiper when the open-and-closed sensor detects a state in which the printer cover is open.

According to this configuration, the operation of the wiper in the state where the wiper cover is open can be regulated by using only one open-and-closed sensor.

(Configuration 6) The printing device, according to the configurations 2 to 5, wherein the wiper cover in an open state is positioned toward a third direction, which is a direction opposite to the first direction with respect to the wiper.

According to this configuration, when the wiper is attached or detached, a portion of the wiper that wipes the printing section is unlikely to come into contact with the wiper cover. Therefore, the wiper cover is unlikely to become dirty when the wiper are inserted and removed from the housing.

What is claimed is:

1. A printing device comprising:

a printing section that is provided on a first direction side with respect to a medium and that performs printing;

a wiper that is detachably attached inside a housing and that is configured to wipe the printing section;

a printer cover configured to open a part of the housing; and a wiper cover, which is openable and closable, wherein the wiper is configured to be pulled out from the housing by being pulled out in a second direction intersecting the first direction, and when the printer cover is closed in a closed state, a portion of the wiper cover interferes with a portion of the printer cover so that the wiper cover is not openable.

2. The printing device, according to claim 1, wherein the wiper cover enters a closed state by moving in a fourth direction opposite to the second direction to cover the wiper.

3. The printing device, according to claim 2, further comprising:

a medium support section configured to support the medium, wherein the printer cover enters the closed state by moving in the fourth direction to cover at least a part of the wiper cover and the wiper cover opens in the second direction.

4. The printing device, according to claim 3, wherein the printer cover opens in the second direction.

5. The printing device, according to claim 3, further comprising:

a control section controlling the printing section and the wiper; and an open-and-closed sensor configured to detect whether the printer cover is open or closed, wherein the control section stops operation of the printing section and the wiper when the open-and-closed sensor detects a state in which the printer cover is open.

6. The printing device, according to claim 1, wherein the wiper cover in an open state is positioned toward a third direction, which is a direction opposite to the first direction with respect to the wiper.

7. The printing device, according to claim 1, wherein, when the printer cover is in an open state, the wiper cover is not covered by the portion of the printer cover so that the wiper cover is openable.

* * * * *